D. R. WATSON.
Clothes-Driers.
No. 134,828.
Patented Jan. 14, 1873.
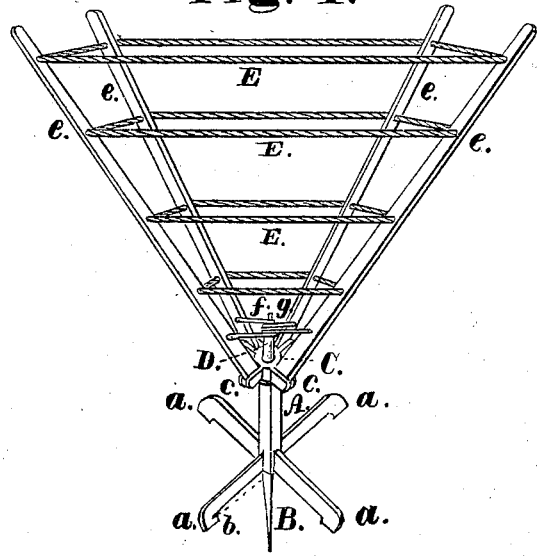
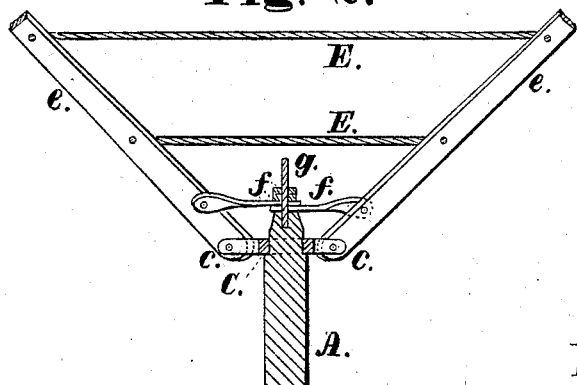
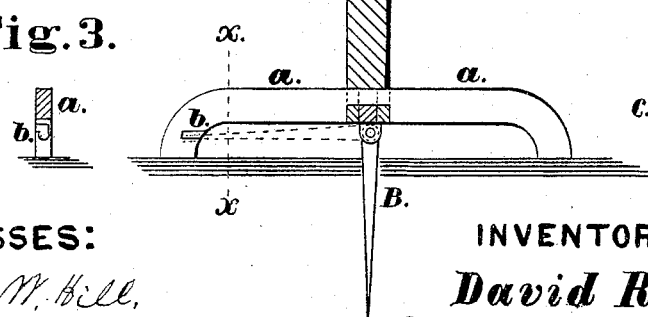
WITNESSES:
Hugh W. Hill,
John W. Rogers.
INVENTOR:
David R. Watson,
Per Charles P. Housum
HIS ATTORNEY.

UNITED STATES PATENT OFFICE.

DAVID R. WATSON, OF MOAWEQUA, ILLINOIS.

IMPROVEMENT IN CLOTHES-DRIERS.

Specification forming part of Letters Patent No. 134,828, dated January 14, 1873.

*To all whom it may concern:*

Be it known that I, DAVID R. WATSON, of Moawequa, in the county of Shelby and State of Illinois, have invented certain Improvements in Clothes-Driers, of which the following is a specification:

My invention relates to an improvement in clothes-driers; and consists of the combination of certain devices whereby the apparatus is pivoted to revolve, can be folded up, and, when used in the open air, secured to the ground with a hinged pin fastened to the standard, which pin, when the drier is used in the house, is fastened to one of the feet of the standard.

Figure 1 is a perspective view of a clothes-drier embodying my invention; Fig. 2 is a transverse vertical section of the same; Fig. 3, a section on the dotted lines $x$ $x$, Fig. 2; and Fig. 4, a plan of the collar.

A is a standard supported by the feet $a$ $a$ $a$ $a$. At the bottom of this standard is hinged a pin, B. When used in the open air this pin is forced in the ground until the feet $a$ $a$ $a$ $a$ rest upon it, when they serve as braces. When used in the house the pin is fastened in one of the feet, in the slot $b$ cut partially on a horizontal line, and dropping down so that the point of the pin will drop in it and be secured.

(See Fig. 3.) C is a collar pivoted and revolving on the axle D formed on the end of the standard. This collar is provided with lugs $c$ $c$ $c$ $c$, in which are hinged the arms $e$ $e$ $e$ $e$, which support the line E passing through holes in the arms. $f f f f$ are braces hinged or pivoted on the arms $e$ $e$ $e$ $e$. These braces have holes in them, and they fit over the pivot $g$ in the end of the axle. These braces, when placed over said pivot, are horizontal, so as to firmly secure the arms $e$ from a lateral displacement, but allow the braces and collar with the arms to revolve on the axle and the pivot $g$.

The arms can be folded up by removing the upper part of the apparatus, (from the collar up,) the braces coming off of the pivot $g$, when they can be turned to the arms, allowing the upper ends of the arms to come together.

I claim as my invention—

The combination of the standard A, feet $a$ $a$ $a$ $a$, hinged pin B, collar C, arms $e$ $e$ $e$ $e$, braces $f f f f$, and pivot $g$, as shown and described, and for the purpose set forth.

DAVID R. WATSON.

Witnesses:
CHARLES P. HOUSUM,
HUGH W. HILL.